June 7, 1966   F. WHEELER   3,254,517
ROTARY LATCH
Filed March 27, 1964   2 Sheets-Sheet 2
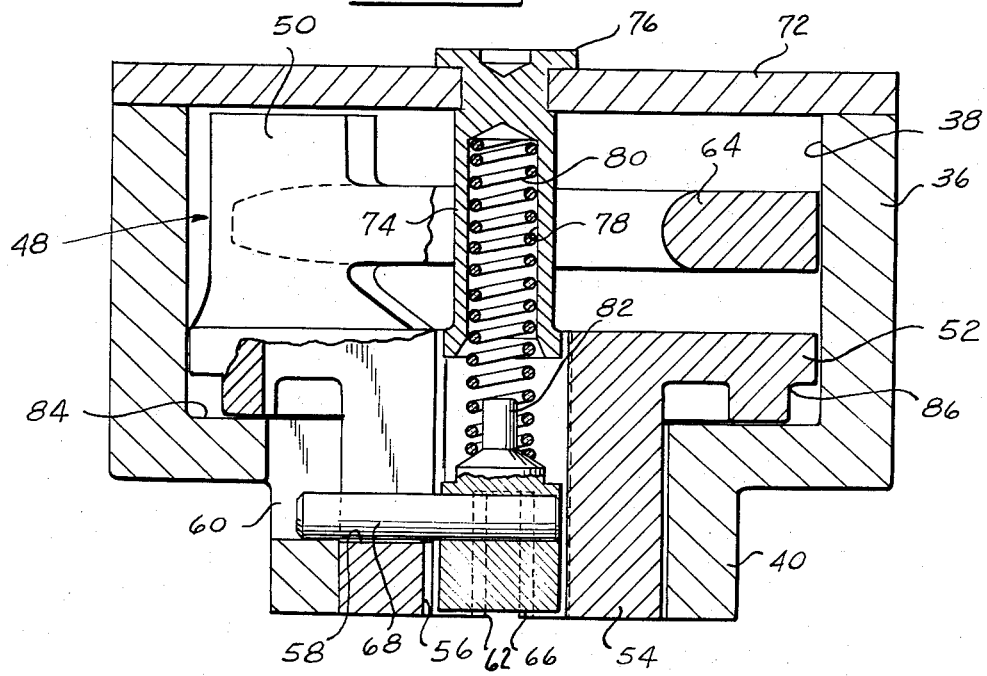
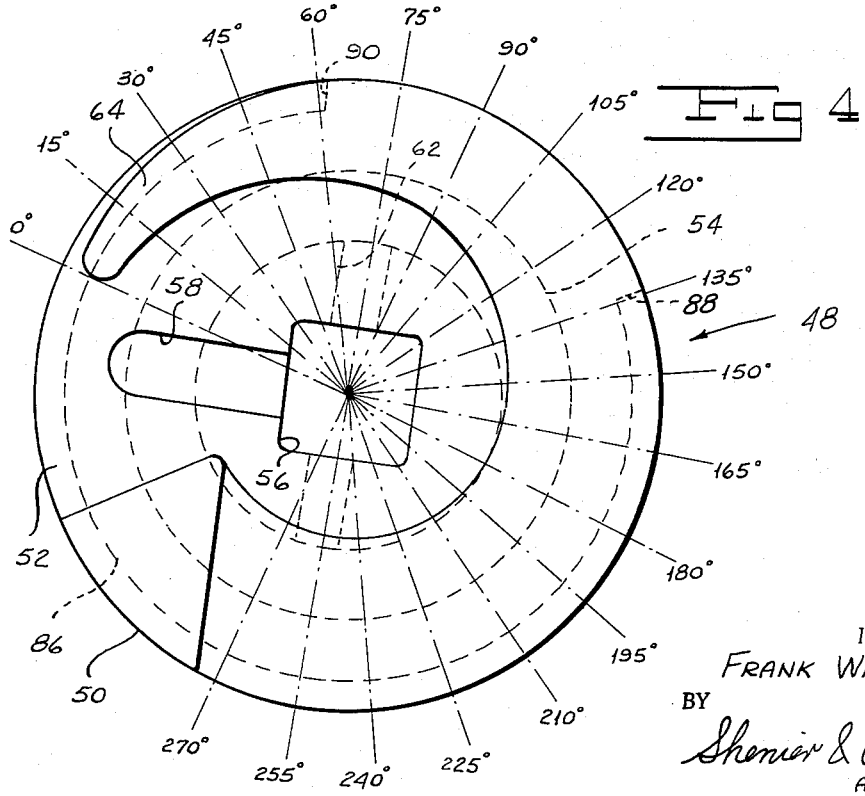
INVENTOR.
FRANK WHEELER
BY
Shenier & O'Connor
ATTORNEYS

United States Patent Office 3,254,517
Patented June 7, 1966

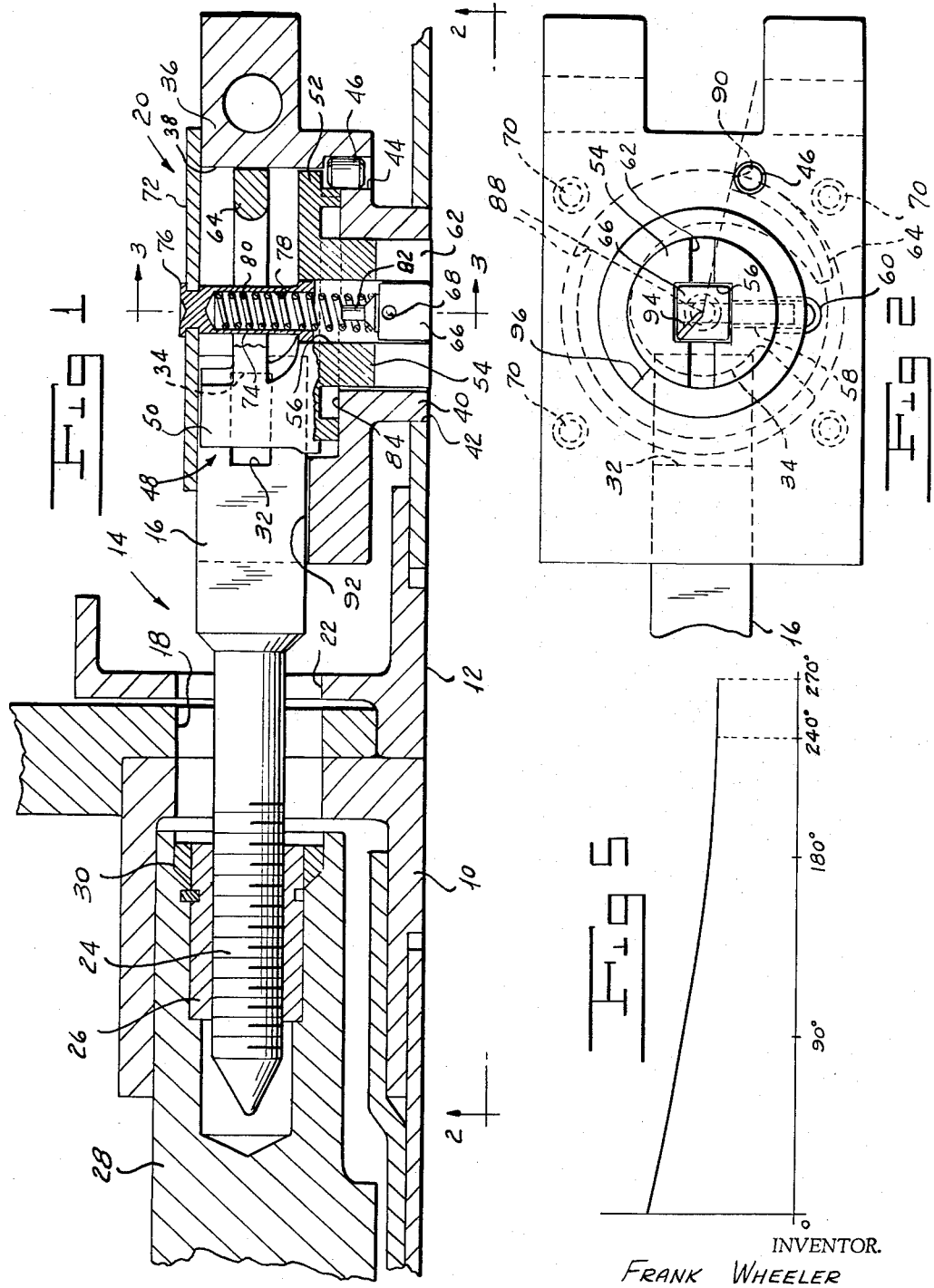

3,254,517
ROTARY LATCH
Frank Wheeler, Little Falls, N.J., assignor to Camloc Fastener Corporation, Paramus, N.J., a corporation of New York
Filed Mar. 27, 1964, Ser. No. 355,359
9 Claims. (Cl. 70—97)

My invention relates to a rotary latch and more particularly to an improved rotary latch which is more rugged and more efficient than are rotary latches of the type known in the prior art.

Many and various forms of fasteners are known in the prior art for holding two members in assembled relationship. One particular type of fastener which is widely used in installations, such as on aircraft, where flush-mounted latches are desirable, is a rotary latch in which the fastener comprises a rotatable cam finger adapted to engage one side of a slot formed in a stud carried by the other member so as to draw the two parts together. A spring pin located at the axis of rotation of the finger normally urges a locking element to a position at which it prevents rotary movement of the cam.

While latches of the type described above have been used, I have discovered that they embody a number of defects. First, the spring pin is relatively flimsy so that in the event for any reason the stud extends too far out of the member carrying the stud, it may strike the spring pin as it moves into the fastener assembly when the parts are brought together. Owing to the weak construction of the pin, such an occurrence most likely will occasion such damage as to destroy the usefulness of the fastener. When the cam of a latch of the prior art moves to its locked position, a locating projection on the stud slot side engaged by the cam finger drops into a detent in the finger so that the latch will resist vibration. This action causes the loss of a considerable amount of the preload which had been achieved as the cam moved to locked position. Another fault of latches of the prior art is that the cam rotation which produces the locking action is relatively small. Consequently, either a high driving force must be provided to rotate the cam to its locking position or the cam must be constructed to provide a relatively low locking force. Therefore, the fastener is not as efficient as is desirable.

I have invented an improved rotary latch which overcomes the defects of rotary latches of the prior art. My latch has a relatively rugged center post construction which is not likely to be damaged if accidentally struck by the stud. My cam engages the stud with a terminal portion having zero cam angle so as to resist vibration, while retaining the preload achieved as the cam moves to locking position. Moreover, my cam has a relatively large rotary travel as it moves from unlocked to locked position so that a smaller cam angle is used and only a relatively low driving force need be provided to achieve the same axial take-up force as is provided in the prior art.

One object of my invention is to provide an improved rotary latch which is more rugged than are rotary latches of the prior art.

Another object of my invention is to provide an improved rotary latch which resists vibration while retaining the preload provided by the latch.

A further object of my invention is to provide an improved rotary latch which is more efficient than are rotary latches of the prior art.

Other and further objects of my invention will appear from the following description.

In general my invention contemplates the provision of an improved rotary latch in which a spring housed by a stout stud normally urges a cam locking element to a position at which it prevents rotation of a cam having a cam finger adapted to engage a slot in a stud. I provide the terminal portion of my cam with zero cam angle and so arrange the parts that a relatively large travel of a cam finger having a small cam angle produces the locking action.

In the accompanying drawings which form part of the instant specification and which are to be read in conjunction therewith and in which like reference numerals are used to indicate like parts in the various views:

FIGURE 1 is a sectional view with parts broken away of my improved rotary latch shown in its locked position.

FIGURE 2 is a bottom plan view of the latch shown in FIGURE 1 with parts removed and taken along the line 2—2 of FIGURE 1.

FIGURE 3 is a sectional view of the fastener assembly of my improved rotary latch taken along the line 3—3 of FIGURE 1 and drawn on an enlarged scale.

FIGURE 4 is a view of the cam of my improved rotary latch.

FIGURE 5 is a developed view illustrating the development of the cam track of the cam finger of my improved rotary latch.

Referring now to the drawings, my improved rotary latch is adapted to secure members 10 and 12 in assembled relationship. I secure the stud assembly indicated generally by the reference character 14 on the member 10 with the stud 16 extending outwardly through an opening 18 in the member 10. I secure the fastener assembly indicated generally by the reference character 20 on the member 12 which is provided with an opening 22 through which the stud 16 extends when it is to be engaged by the fastener assembly 20. While I have not shown the details of the structure for mounting the stud assembly 14 and the fastener assembly 20 respectively on the members 10 and 12, it will readily be appreciated that I may employ any suitable means, such as bolts or the like (not shown).

The stud 16 has a threaded shank 24 in engagement with an insert 26 secured in a mounting block 28 by any suitable means, such as a lock ring 30. The end of the stud 16 remote from shank 24 is provided with a slot 32 having a curved surface 34 adapted to be engaged in a manner to be described.

The fastener assembly 20 comprises a cam housing 36 having a generally circular recess 38 therein and a reduced diameter portion 40 disposed in an opening 42 in the member 12. A recess 44 in housing 36 carries a cam stop pin 46.

Recess 38 in housing 36 rotatably receives the cam indicated generally by the reference character 48 of my rotary latch. Cam 48 comprises a body 50 having a base 52 and a reduced diameter extension 54 below the base. The extension 54 has a centrally located non-circular opening 56 therethrough. In the particular form shown in the drawing, opening 56 is square in cross section. A stop pin receiving slot 58 extends outwardly from one side of the opening 56 for a predetermined distance down into the extension 54. Housing 40 has a slot 60 which registers with the slot 58 when the cam 48 is locked in a manner to be described. I form the lower end of extension 54 with a tool-receiving slot 62 into which a tool, such as a screwdriver, may be inserted in a manner to be described to unlock the cam.

Body 50 carries a cam finger 64 extending around the axis of rotation of the cam. Opening 56 receives a stoppin block 66 having generally the same cross-sectional shape as does the opening 56 so that the block 66 can move axially in the opening 56 but is prevented from rotating relative thereto. I mount the stop pin 68 on block 66 for movement therewith. Pin 68 is long enough to permit it to ride into the slot 60 in housing 36 when this slot registers with the slot 58 in the cam.

I employ any suitable means, such as screws 70, to secure a cover plate 72 on the top of housing 36 to retain the cam within the housing. Cover 72 supports a center post 74, one end 76 of which extends through the cover plate and is upset so as to retain the post in position on the cover. The end of the post 74 remote from end 76 extends into the opening 56 in the cam. I form the center post 74 with an axially extending bore 78 for receiving a spring 80. The other end of spring 80 surrounds a guide pin 82 on the block 66.

From the structure thus far described, it will be apparent that when a tool, such as the screwdriver or the like, is inserted in the slot 62, it moves the block 66 upwardly as viewed in FIGURES 1 and 3 until the stop pin 68 is in a position at which it can ride on a surface 84 in housing 36. When the stop pin has been moved to this position, cam 48 can move in one direction or the other with the tool depending upon the relative position of the cam and the stud 16.

I form the underside of the base 52 with a peripheral groove 86 extending around the underside of the base for a distance of approximately 285 degrees to form respective stop shoulders 88 and 90. It will be appreciated that the stop shoulders 88 and 90 engage the stop pin 46 at two respective limit positions of the cam. In one of these positions, the cam is moved to a position at which stop 88 engages the pin. This is the open position of the fastener. Moreover, in this position it will be appreciated that the lock pin 68 rests on the surface 84. With the parts in this relative position, members 10 and 12 are brought together to cause stud 16 to enter into the housing 36 through an opening 92 so that the slot 32 is properly positioned for reception of the cam finger 64. With the parts in this position, the cam 48 is rotated in a direction such as will move the cam to bring stop 90 into engagement with pin 46. In the course of this movement, cam finger 64 draws stud 16 into the housing firmly to clamp the parts together. Ultimately the slot 58 in the cam registers with the slot 60 in the housing and pin 68 drops to the bottom of the slot 60. I have provided a mark 94 on block 66 which is aligned with a mark 96 on the housing to provide a visual indication of the fact that the parts are in a position in which the fastener should be locked.

Referring now to FIGURE 5, I have shown a developed view of the cam finger 64 with the abscissa in terms of angular position around a cam axis from a zero degree position at the leading edge of the cam to a final position at the terminal portion of the cam. The ordinate indicates the distance from the axis of rotation of the cam to the cam surface. From FIGURE 5, it will readily be apparent that my cam has a low cam angle and that a very large rotary movement of the cam occurs in its movement from open to locked position. Moreover, over the extent of the cam track from about 240 degrees to about 270 degrees, I provide zero cam angle so that my cam has no "downhill" effect tending to move the cam toward open position so that the fastener resists vibration. It will be noted moreover that I achieve this result without sacrificing any of the preload produced in the course of movement of the cam.

In operation of my improved rotary latch, in order to move the latch to its open position, a tool, such as a screwdriver, is inserted in slot 62 to move block 66 and pin 68 upwardly as viewed in FIGURES 1 and 3 against the action of spring 80 until pin 68 is above the level of surface 84. Then the cam can be turned to a position at which shoulder 88 is in engagement with the stop pin 46. In this position of the parts, opening 92 is not blocked by the cam and in order to assemble the members 10 and 12, stud 16 may be moved into the opening 92 until it arrives at a position at which its opening 32 may receive the cam finger 64. If for any reason the stud 16 extends too far out of opening 18 so that it might engage the post 74, there is little likelihood of damage. This is owing to the fact that the post itself is relatively stout and its end remote from the end 76 is disposed in the opening 56.

If the parts are properly positioned, the direction of rotation of the cam is reversed so that the finger 64 enters into the slot 32. As rotary movement of the cam in this direction continues, the cam finger draws the stud 16 gradually into a position at which the parts 10 and 12 are locked. As can be seen by reference to the developed view in FIGURE 5 of the cam track, only a relatively low driving force is required to produce this movement since the cam has a large rotational travel and a relatively low cam angle. When the cam is moved through about 240 degrees, continued rotation of the cam will not produce any additional take-up force since the remaining portion of the cam track has zero cam angle. While this terminal cam surface portion has no cam angle, it does lock the cam without any "downhill" effect and, moreover, none of the preload which is applied to the parts during the initial movement of the cam is lost. Ultimately, the shoulder 90 engages the cam to prevent further movement. This is the locked position of the cam as indicated by the registering marks 94 and 96. Also in this relative position of the parts, the stop pin 68 is aligned with slot 60 so that as the tool, such as a screwdriver, is withdrawn from the slot 62, the lock pin 68 may move under the action of spring 80 downwardly in the slots 58 and 60 as viewed in FIGURE 3 to lock the cam in its clamping or latching position.

It will be seen that I have accomplished the objects of my invention. I have provided an improved rotary latch which is more rugged than are latches of this type known in the prior art. My improved rotary latch locks the cam in its latching position without loss of any preload. My cam has a relatively large rotational travel and a low cam angle thus making it more efficient than are rotary latches of the type known in the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A rotary fastener including in combination a support, a cam member comprising an arcuate cam finger and a base mounted for rotary movement on said support around an axis between an operative and an inoperative position of said finger, an opening in said base extending in the direction of said axis, a locking block, interengageable means on said block and on said support for preventing rotation of said cam member, said block being disposed in said opening for movement between a first position at which said interengageable means are engaged and a second position at which said interengageable means are out of engagement, a post carried by said support, said post having a bore in line with said base opening and extending in the direction of said axis and a spring extending between the base of said bore and said block for urging said block to said first position, said bore having a length such that said post houses a substantial portion of said spring.

2. A fastener as in claim 1 in which said block is accessible for engagement by a tool to move the block to said second position.

3. A fastener for engaging a receiving element to hold two members in assembled relationship including in combination a housing provided with an opening through which said element is adapted to be inserted into said housing, an arcuate cam member comprising a curved cam finger and a base carried by said housing for rotary movement around an axis between a first position at which said finger may engage said element and a second position at which said cam finger is inoperative, said base being provided with an opening extending in the direction of said axis, a locking block, interengageable means on said block and on said housing adapted to prevent rotation of said cam member, said block being disposed in said base opening for movement between a first position at which said interengageable means are engaged and a second position at which said interengageable means are out of engagement, a casing carried by said housing, said casing having a bore extending in the direction of said axis, and a spring extending between the base of said bore and said block for urging said block to said first position, said bore having a length such that said casing houses a substantial part of said spring.

4. A fastener as in claim 3 in which said housing has a top and in which said casing extends from said top to within said base opening.

5. A fastener as in claim 3 in which said interengageable means comprise a pin on said block and a slot in said housing.

6. A fastener as in claim 3 in which said cam base opening wall has a slot therein and in which said interengageable means comprise a pin on said block and a slot in said housing, said base opening wall slot adapted to register with said housing slot in the second position of said cam member.

7. A fastener as in claim 3 in which said cam finger has a cam surface defined by radii progressively decreasing around said axis from the start of said cam surface to the end thereof for an angular distance of appreciably greater than 180 degrees.

8. A fastener as in claim 3 in which said cam finger has a cam surface defined by radii progressively decreasing around said axis from the start of said cam surface to the end thereof for an angular distance of about 240 degrees and a locking surface concentric with said axis extending from the end of said cam surface around said axis for about 30 degrees.

9. A rotary fastener for securing two members in assembled relationship including in combination a stud having a slot, said stud being carried by one of said members, a fastener comprising a rotary cam finger adapted to move into said slot to engage said stud, means mounting said finger for rotary movement around an axis on the other of said members for movement from an open position at which said finger will not engage said stud as said members are moved to operative relationship to a second position at which said finger may move into said slot with said members in operative relationship, means adapted to be actuated to rotate said cam finger into said slot to engage said stud to draw said members together, said cam finger having a cam surface extending over appreciably greater than 180 degrees around said axis, said cam finger having a cam surface defined by radii progressively decreasing around said axis from the start of said cam surface to the end thereof and a locking surface defined by a generally constant radius over the extent of said surface to make said surface substantially concentric with said axis at the end of said cam surface.

References Cited by the Examiner

UNITED STATES PATENTS

| | | | |
|---|---|---|---|
| 2,548,681 | 4/1951 | Oswald | 292—240 |
| 2,666,248 | 1/1954 | Slaughter | 292—240 X |
| 2,919,569 | 1/1960 | Davis | 70—97 |

FOREIGN PATENTS

| | | |
|---|---|---|
| 367,147 | 12/1906 | France. |
| 1,305,160 | 11/1961 | France. |

OTHER REFERENCES

German printed application No. 17,294, August 1956.

JOSEPH D. SEERS, *Primary Examiner.*

BOBBY R. GAY, *Assistant Examiner.*